United States Patent
Siemssen

(10) Patent No.: US 10,205,679 B2
(45) Date of Patent: *Feb. 12, 2019

(54) RESOURCE OBJECT RESOLUTION MANAGEMENT

(71) Applicant: Amazon Technologies, Inc., Seattle, WA (US)

(72) Inventor: Bradford W. Siemssen, Federal Way, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/435,151

(22) Filed: Feb. 16, 2017

(65) Prior Publication Data

US 2017/0163560 A1   Jun. 8, 2017

Related U.S. Application Data

(62) Division of application No. 13/561,935, filed on Jul. 30, 2012, now Pat. No. 9,576,062.

(51) Int. Cl.
*H04L 12/927* (2013.01)
*G06F 17/30* (2006.01)
(Continued)

(52) U.S. Cl.
CPC ...... *H04L 47/803* (2013.01); *G06F 17/30887* (2013.01); *H04L 67/16* (2013.01);
(Continued)

(58) Field of Classification Search
CPC .......... G06F 17/30887; H04L 67/327
See application file for complete search history.

(56) References Cited

U.S. PATENT DOCUMENTS 7,472,201 B1 * 12/2008 Aitken ............. H04L 29/12066
709/245
9,576,062 B1 * 2/2017 Siemssen ................ H04L 67/16
(Continued)

OTHER PUBLICATIONS

P. Vixie et al., Dynamic Updates in the Domain Name System (DNS Update), Memo, Network Working Group, Apr. 1997, 32 Pages.

*Primary Examiner* — Backhean Tiv
(74) *Attorney, Agent, or Firm* — Knobbe, Martens, Olson & Bear, LLP

(57) ABSTRACT

Systems and methods are disclosed for management of resource objects ("resources") within a computing environment. Resources may be stored in a number of resource spaces, each including service endpoints configured to facilitate access to resources. On creation of a resource, an identifier may be assigned to the resource. Thereafter, the identifier may be used to determine an appropriate service endpoint for accessing the resource. For example, each resource space may submit a set of resolution rules to a resolution server. Each set of resolution rules may be used to identify an appropriate endpoint for accessing a resource. Thereafter, a request for a resource may first retrieve the set of resolution rules, and use such rules to determine an appropriate service endpoint. Illustratively, utilization of resource resolution rules may enable the service endpoint to be modified without requiring modification of client devices.

20 Claims, 5 Drawing Sheets

(51) Int. Cl.
  *H04L 29/08*     (2006.01)
  *H04L 29/06*     (2006.01)
  *H04L 12/803*    (2013.01)

(52) U.S. Cl.
  CPC ............ *H04L 69/03* (2013.01); *H04L 47/125* (2013.01); *H04L 67/327* (2013.01)

(56) References Cited

U.S. PATENT DOCUMENTS

| | | | | |
|---|---|---|---|---|
| 9,710,865 B1* | 7/2017 | Siemssen | ............. | G06Q 50/188 |
| 2002/0138649 A1* | 9/2002 | Cartmell | ................. | H04L 29/06 |
| | | | | 709/245 |
| 2003/0058860 A1* | 3/2003 | Kunze | .................... | H04L 45/04 |
| | | | | 370/392 |
| 2003/0069016 A1* | 4/2003 | Bahl | ................. | H04L 29/12311 |
| | | | | 455/432.1 |
| 2003/0179742 A1* | 9/2003 | Ogier | .................... | H04L 1/1614 |
| | | | | 370/351 |
| 2004/0083306 A1* | 4/2004 | Gloe | ................. | H04L 29/12066 |
| | | | | 709/245 |
| 2005/0220082 A1* | 10/2005 | Toyoda | ............... | H04L 12/6418 |
| | | | | 370/352 |
| 2009/0248873 A1* | 10/2009 | Johnsson | .......... | H04L 29/12066 |
| | | | | 709/226 |
| 2009/0300191 A1* | 12/2009 | Pace | ...................... | G01D 4/002 |
| | | | | 709/228 |
| 2010/0049842 A1* | 2/2010 | Koski | ................. | H04L 67/2814 |
| | | | | 709/223 |
| 2010/0250680 A1* | 9/2010 | Bhatt | .................... | H04L 45/306 |
| | | | | 709/206 |
| 2011/0271005 A1* | 11/2011 | Bharrat | ............... | H04L 61/1511 |
| | | | | 709/232 |
| 2011/0289434 A1* | 11/2011 | Kieft | ................. | G06F 17/30887 |
| | | | | 715/760 |
| 2013/0117308 A1* | 5/2013 | Korhonen | ......... | H04L 29/12113 |
| | | | | 707/770 |
| 2013/0340031 A1* | 12/2013 | Amit | ................. | H04L 63/0281 |
| | | | | 726/1 |
| 2017/0163560 A1* | 6/2017 | Siemssen | ................ | H04L 67/16 |

* cited by examiner

RESOURCE OBJECT RESOLUTION MANAGEMENT

CROSS-REFERENCE TO RELATED APPLICATIONS

This application is a divisional of U.S. patent application Ser. No. 13/561,935, entitled "RESOURCE OBJECT RESOLUTION MANAGEMENT" and filed Jul. 30, 2012, the entirety of which is incorporated herein by reference.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private and/or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit, of the general public.

Data centers may provide a number of network accessible services to computing devices. Further, data centers may store and maintain a variety of information related to or created by a variety of computing processes or services. For example, information may be stored in databases or other data stores, and made available to computing devices either within a data center or external to a data center. In order to access services or information provided by such services—a computing device may be required to know a network address at which a service may be reached. Further, in some embodiments, a computing device may be required to know an identifier associated with a specific item of information or service. By utilizing a network address to request information corresponding to an identifier of a service or information item, the service or information item may be accessed by a requesting computing device.

In some instances, an address of a service or information item may be independent of the service or information item itself. For example, services and information items may be made available via a variety of protocols. Each protocol may define common mechanisms by which computing devices (or other devices) may communicate with one another. Within a networked communication context, examples of protocols may include Hypertext Transfer Protocol (HTTP), Simple Mail Transfer Protocol (SMTP), and Simple Object Access Protocol (SOAP). Moreover, in some instances, multiple protocols may be used in conjunction. For example, SOAP and HTTP may be used in conjunction in order to transmit, receive or process information. Further, protocols may be modified or altered in order to suit the needs of the user of the protocol. For example, a developer of computing software may conform to the principals of Representational State Transfer (REST) when utilizing a protocol (e.g., HTTP), the combination of which may also be considered a "protocol" (e.g., "REST/HTTP"). Accordingly, a given service or information item may be made available at a variety of addresses (e.g., corresponding to different protocols, locations, etc.).

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
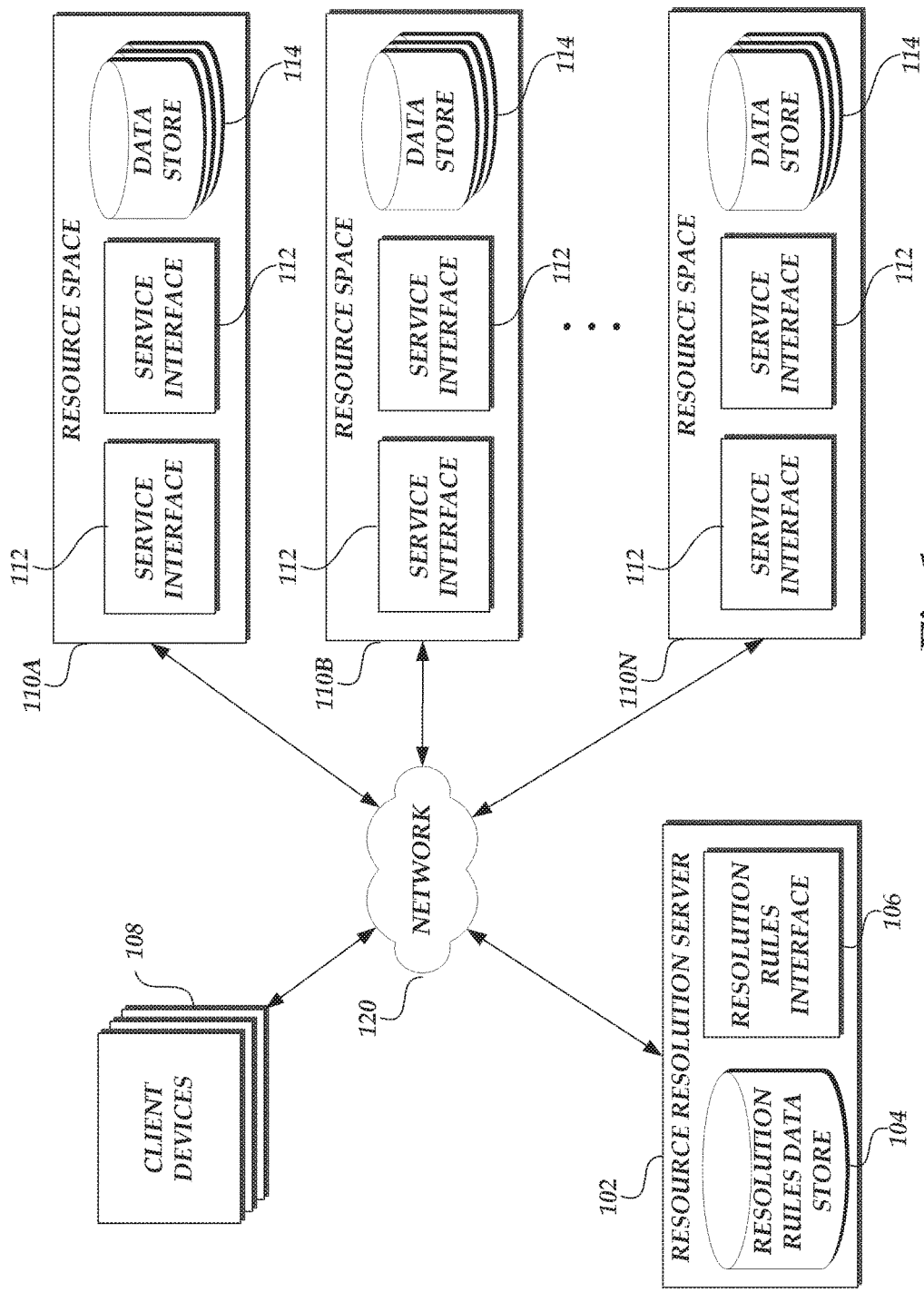
FIG. 1 is a schematic block diagram depicting an illustrative operating environment in which a resource resolution server enables client devices to resolve resource addresses of a number of resources within a set of resource spaces.

Generally described, aspects of the present disclosure relate to managing resources objects on computing networks. As used herein, resource objects ("resources") may generally refer to any identifiable entity or thing that can be identified, named, addressed or handled in a networked communication system. For example, resources may correspond to information or items of information stored within a database or other data store. Moreover, resources may correspond to services or software applications (e.g., a web server, a database storing information, a search engine, etc.). Still further, resources may include interfaces, such as application programming interfaces. Generally described, resources may be made available via a network by reference to a resource identifier (e.g., a resource name) and a resource address (e.g., a location at which to find the resource). In some instances, a resource address may be independent of the resource itself. For example, a resource may be relocated, and therefore made available at a new resource address. Moreover, a resource may be available at more than one resource address at any given time. For example, a resource address may be partially or wholly dependent on the protocol used to interact with the resource. Illustratively, the same resource may be made available via a SOAP/HTTP protocol, a SOAP/SMTP protocol, a REST/HTTP protocol, etc. In some instances, a resource address at which a resource is made available may change over time (e.g., as new software or hardware is implemented, etc.). As such, aspects of the present disclosure relate to managing address information of resources such that, given an identifier of the resource, an address of the resource may be resolved to the resource as the address changes. Further, aspects of the present disclosure relate to managing resources associated with multiple addresses, such that a desired address may be returned that conforms to desired criteria (e.g., a desired protocol). For example, systems and methods disclosed herein may facilitate returning a current address of an object A when using a REST/HTTP protocol.

Specifically, one or more resource resolution servers may be provided which store rules regarding the resolution of resource addresses. When a computing device (e.g., a client device) is attempting to identify the address of a resource, the device may first request rules regarding the resource from a resource resolution server. Thereafter, the requesting computing device may utilize the retrieved resolution rules in order to identify an appropriate address for the desired resource. For example, rules may specify that, for a given resource identifier "MyResource" and a desired protocol of "REST/HTTP," the resource may be located at "http://resourceserver.domain.TLD:1111/getResource?resourceID=MyResource." In some embodiments, rules for resolving a resource address may be maintained by the same entity that manages the resource itself. For example, a computing device (or administrator thereof) that manages the "MyResource" resource may alter resolution rules to add support for a new protocol. Illustratively, the "MyResource" resource may be made available via the SOAP/HTTP protocol at "http://resourceserver.domain.TLD:2222/getResource?resourceID=MyResource."

As a further example, resolution rules may be altered to reflect a change in a physical endpoint that handles requests for a resource. For example, a resource may initially be accessed worldwide at a single, global server (e.g., "http://globalserver.TLD"). However, at a later point in time, frequency of access to the resource may require that multiple, regional servers be implemented (e.g., "http://NAserver.TLD" for North America, "http://EUserver.TLD" for Europe, etc.). As such, resource rules may be updated such that a request for a North American resource is pointed to the North American server; a request for a European resource is pointed to a European server; etc. In this manner, a resource may be accessed without requiring independent knowledge of the address at which the resource is available.

In some embodiments, resources may be grouped according to any logical or physical criteria. For example, resources of similar types may be grouped into "resource spaces." In some embodiments, resources spaces may be administered by different entities, and the collection of resources within a resource space may be determined by each entity independently. As such, each resource space may contain any collection of resources, even if those resources are similar to or duplicative of resources in other resources spaces. In other embodiments, multiple resource spaces may be administered by a single entity or multiple related entities. As such, each resource space may contain a divided portion of resources. For example, resource spaces may be defined for creation of a collaborative website (e.g., a "wiki"). A first resource space may include resources related to articles or web pages available on the wiki, while a second resource space includes resources related to users, a third resource space includes resources related to community forums, etc. As a further example, resource spaces may be defined for an e-commerce website. Illustratively, a first resource space may include resources related to items offered for sale, a second resource space may include resources related to user accounts, a third resource space may include resources related to placed orders, etc.

In addition to resources, resource spaces may include service interfaces for accessing a resource. For example, a service interface may be configured to receive a request for information regarding a resource formatted according to a given protocol. Illustratively, a first service interface may be configured to receive requests in the REST/HTTP protocol; a second service interface may be configured to receive requests in the SOAP/HTTP protocol; etc. Moreover, different service interfaces may be configured to receive requests for resources according to an identifier of the resource. For example, a first service interface may be configured to receive requests for a first type of resource identifier (e.g., "identifier version 1") while a second service interface may be configured to receive requests for a second type of resource identifier (e.g., "identifier version 2"). Still further, different service interfaces may be configured to receive requests for resources according to an aspect of a requesting device. Illustratively, different service interfaces may be configured to process requests according to a location of a requesting device (e.g., continent, country, region, city, etc.) or according to an identity of the requesting device (e.g., production or non-production, authenticated or non-authenticated, user facing or non-user facing, etc.).

Accordingly, in order to determine a correct address for a given resource, a requesting device may be required to determine a resource space in which the resource exists, as well as an appropriate service interface by which to request the resource. As such, systems and methods may be provided for determining, based at least in part on resource resolution rules, a resource space and service interface that correspond to a given resource. In some embodiments, multiple resource resolution rules may be utilized, such that resolution of a resource address may occur through combined use of multiple, linked resolution rules. Further, in some embodiments, resolution rules may be administered by entities associated with each resource space, such that each resource space (or an entity associated with each resource space) may independently manage resolution of resource addresses.

In other embodiments, resolution rules may be configured such that resolution rules are indefinitely backwards compatible. For example, rather than replace a given set of resolution rules with an updated version, rules may be amended, such that identifiers corresponding to an outdated set of resolution rules are still resolvable given the rules. For example, rules may enable resolving of multiple versions of address identifiers at a single time. Illustratively, a resource identifier conforming to a latest version may resolve to a resource address capable of handling a request for the resource at a high speed, while a resource identifier conforming to an outdated version may resolve to a resource address capable of handling requests at a relatively slower speed. Because resolution rules may enable resolution of any number of resource identifier formats, it is possible to indefinitely resolve even very old resource identifiers.

In still more embodiments, resource rules may enable resource identifiers to include information facilitating rapid resolution of a resource address. For example, resource rules may modify a resource address based on a characteristic of a requesting client device (e.g., user-facing or non-user facing). Moreover, resource rules may enable the use of additional information in resource identifiers themselves, such as "hint" information that facilitates resolving of a correct resource address. Examples of additional information that may be utilized for resolving resource addresses will be described below.

Subsequent to identification of a resource address, a requesting client device may interact with a resource according to a specified protocol. For example, a web server associated with a collaborative website may, based on a resource identifier and a set of resource resolution rules, interact with a first resource space to retrieve a listing of articles available on the website. Similarly, the web server may interact with a second resource space to retrieve a listing of users on the website, or to authenticate a requesting user. In accordance with embodiments of the present disclosure, each resource space may modify addressing of resources or implement additional protocols, and modify resolution rules accordingly. As such, interfacing devices (e.g., the web server discussed above) that utilize the resolution rules would not be required to modify their configuration in order to resolve new resource addresses.

With reference to FIG. 1, an illustrative operating environment is shown which includes a resource resolution server 102 that enables client devices 108 to resolve resource addresses corresponding to resources available via a variety of resource spaces 110. As illustrated in FIG. 1, the operating environment includes one or more client devices 108. Though general reference is made herein to clients, each client device 108 may correspond to any computing device (e.g., physical, virtual, etc.) that may request access to or information regarding a resource in one of a number of resource spaces 110. For example, in some embodiments, a client device 108 may correspond to a device of an end user of a web site or service, such as a general purpose computing device, mobile phone, PDA, tablet, laptop, set top box, internet-connected television, etc. In other embodiments, a client device 108 may correspond to a server, such as a web server or a database server. As such, though reference is made to clients, client devices 108 should not be construed to include only user-facing devices. In some embodiments, client devices 108 are embodied in a plurality of devices, each executing an instance of the respective device. In addition, a client device 108 may include a network interface, memory, processing unit, and non-transitory computer-readable medium drive, all of which may communicate with each other by way of a communication bus. Moreover, a processing unit may itself be referred to as a client device. The network interface may provide connectivity over the network 120 and/or other networks or computer systems. The processing unit of the client device may communicate to and from memory containing program instructions that the processing unit executes in order to operate the device. The memory generally includes RAM, ROM, and/or other persistent and/or auxiliary non-transitory computer-readable storage media.

Moreover, though shown as distinct from each resource space 110, in some embodiments, client devices 108 may be associated with or reside within a resource space 110. For example, a first service operating within a first resource space 110A may require access to a resource within a second resource space 110B. As such, the first service may constitute a client device 108. Accordingly, a client device 108 may generally correspond to any computing device that may access a resource within a resource space 110.

As shown in FIG. 1, the illustrative operating system may include any number of resources spaces 110A-N. Moreover, in some embodiments, an operating environment may include only one resource space. A resource space 110 may generally correspond to any collection (logical, physical, or otherwise) of resources and/or computing devices configured to provide access to those resources. For example, a resource space corresponding to an e-commerce site may include all items available for purchase, all orders placed via the site, all users of the site, etc. Each resource space may include one or more data stores 114 for storing information regarding resources. Generally speaking, data stores 114 may include hard disk drives (HDDs), solid state drives (SSDs), tape drives, databases, network attached storage (NAS), or any other persistent or substantially persistent memory storage devices, or any collection or combination thereof. As will be described in more detail below, data stores 114 may be located in a single physical location, or may be located in diverse locations (e.g., regions, continents, etc). Although depicted in FIG. 1 as local to the resource spaces, one or more of the data stores 114 may be accessible over the network 120 and/or may be embodied as a web service. In addition, each resources space 110 may include a number of service interfaces 112. Illustratively, each service interface may correspond to a collection of computing devices configured to provide access to resources via a distinct protocol. For example, a first service interface 112 may provide access to resources (e.g., information stored in a data store 114) via the SOAP/HTTP protocol, while a second service interface 112 may provide access to the same or similar resources via the REST/HTTP protocol. Accordingly, in order to access a resource within a given resource space 110, a client device 108 may request the resource via a given service interface 112 that is configured to enable access to the resource via a desired protocol. Similarly to a resource space 110, service interfaces 112 may be any logical or physical grouping of computing devices, or software implemented by a computing device, that is configured to provide access to a resource via a protocol. As will be discussed in more detail below with respect to FIG. 2, in some embodiments, service interfaces 112 may include a number of regional service groups (e.g., North American, European, Asian, etc.). Further, each regional group may itself include a number of service endpoints, each configured to facilitate access to resources by a given group of client devices 108.

In order to facilitate communication between client devices 108 and resource spaces 110, the illustrative operating environment may further include a resource resolution server 102. The resource resolution server 102 may correspond to any computing device (e.g., virtual or physical) configured to facilitate resolution of resource addresses. For example, resource resolution server 102 may be a physical server that includes a network interface, a processing unit, an input/output device interface, a display (optional), an input device, and a computer readable medium drive, all of which may communicate with one another by way of a communication bus. The network interface may provide connectivity to the network 120 and/or one or more networks or computing systems. The processing unit may thus receive information and instructions from other computing systems or services via the network 120. The processing unit also communicates to and from memory and further provides output information for a display (optional) via the input/output device interface. The processing unit of the client device may communicate to and from memory containing program instructions that the processing unit executes in order to operate the device. The memory generally includes RAM, ROM, and/or other persistent and/or auxiliary non-transitory computer-readable storage media.

Illustratively, the resource resolution server 102 may include a resolution rules interface 106 by which it receives resolution rules from resource spaces 110, and delivers resolution rules to client devices 108. In some embodiments, a resolution rules interface 106 may be a hardware component of the resolution server 102, such a computing device (or portion thereof) configured to transmit and receive information from one or more resource spaces 110, client devices 108, or other computing devices. In other embodiments, a resolution rules interface 106 may correspond to software or computer-executable modules implemented by one or more computing devices. As will be described in more detail below, resolution rules may generally correspond to any set of information that facilitates resolution of a resource address based on a resource identifier. For example, resolution rules may include that any resources corresponding to a resource identifier between 1 and 100 are available from resource space 110A, while resource identifiers between 101 and 201 are available from resource space 110B, etc. In some embodiments, resolution rules may be received from each resource space 110A and stored within a resolution rules data store 104 associated with the resource resolution server 102. Similarly to data stores 114 described above, the resolution rules data store 104 may correspond to a HDD, SSD, NAS, tape drive, data base, or any other persistent or substantially persistent memory storage device. Moreover, the resolution rules data store 104 may correspond to any collection or combination of the above. Although depicted in FIG. 1 as local to the resource resolution server 102, the resolution rules data store 104 may be accessible over the network 120 and/or may be embodied as a web service.

As will be described in more detail below, the resource resolution server 102 may be configured to transmit resolution rules to one or more client devices 108 in response to requests. Illustratively, a client device 108 may require information regarding a specific resource identifier "110A: 112.1:ABC." As such, the client device 108 may transmit a request to the resource resolution server 102 in order to obtain resolution rules facilitating identification of a proper service interface for requesting information regarding the resource. For example, the resolution rules may state that requests for resource identifiers beginning with "110A" should be directed to resource space 110A. Further, the resolution rules may state that requests for resource identifiers including "112.1" should be directed at a first service interface 112 within an identified resource space 110 (e.g., resource space 110A). Finally, resolution rules may state that, for REST/HTTP protocol requests to a first service interface 112 of resource space 110A, requests may be transmitted to "http://serviceEndpoint.myServer.TLD/getResource?id=[ID]," where "[ID]" corresponds to any portion of an identifier following a final colon symbol. As such, a client device 108 may determine that, based on the rules described above, a request via the REST/HTTP protocol for resource identifier "110A:112.1:ABC" should be directed to "http://serviceEndpoint.myServer.TLD/getResource?id=ABC." As will be appreciated by one skilled in the art, rules may be modified during operational use of resources, such that resource addresses may be modified without requiring client devices 108 to modify their own configuration. For example, a resource space may, at a given point in time, decide to implement a different format for resolving resource addresses (e.g., utilizing dashes rather than colons). Accordingly, the resolution rules may be updated such that older style resource addresses (using colons) would continue to be routed to the correct service endpoints within a resource space, while newer style resource addresses could be routed to new or existed service endpoints.

In some embodiments, the flexibility of resolution rules may facilitate ease of deprecation of resource identifier formats, without requiring that deprecated resource identifiers become obsolete. For example, a resource space 110 may include two distinct service endpoints: a first service endpoint that handles, at a high rate of speed, all requests conforming to a most recent resource identifier format; and a second service endpoint that handles, at a low rate of speed, all requests conforming to deprecated resource identifier formats. Accordingly, if a new resource identifier format were to be implemented, resolution rules may be updated to reflect that all requests conforming to the new resource identifier format should be directed to the first service endpoint, while all other request formats (including, for example, the recently outdated format as well as already deprecated formats) be transmitted to the second service endpoint. As such, requests utilizing a deprecated resource identifier format may continue to work indefinitely (though, in this example, at a slower speed).

Figure 2:
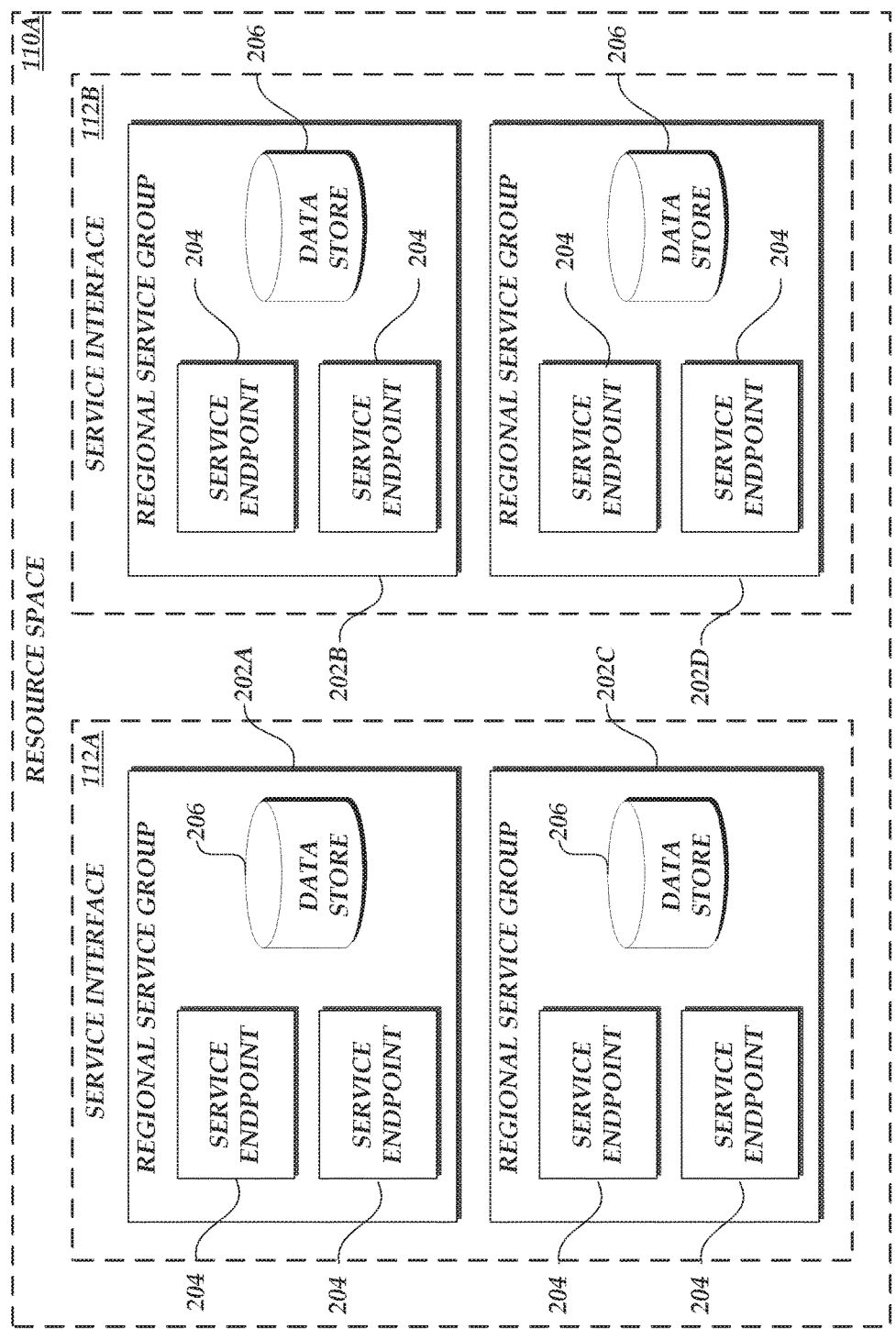
FIG. 2 is a schematic block diagram depicting an illustrative resource space of FIG. 1 including a number of service interfaces, each service interface including a number of regional service groups, each regional service group including a number of service endpoints configured to provide access to a resource.

With respect to FIG. 2, an illustrative embodiment of a resource space, such as resource space 110A of FIG. 1 is described in more detail. As described in FIG. 1, a resource space 110 may include a number of service interfaces 112. For example, the illustrative resource space 110A of FIG. 2 may include two service interfaces 112A and 112B. Each service interface 112 (e.g., service interfaces 112A and 112B) may correspond to a collection of service endpoints 204 configured to facilitate interaction with resources according to a given protocol. For example, each service endpoint 204 of service interface 112A may be configured to respond to requests utilizing a SOAP/SMTP protocol, while each service endpoint 204 of service interface 112B may be configured to respond to requests utilizing a REST/HTTP protocol. Generally described, a service endpoint 204 may correspond to any computing device, virtual or physical, configured to handle requests for resources. Moreover, though shown as distinct within FIG. 2, in some embodiments, multiple service endpoints 204 may be provided by a single computing device. For example, a single physical computing device may facilitate interaction with resources according to a number of different protocols. Still further, in some embodiments, different service endpoints 204 may be configured to handle requests for resources according to an aspect of the requestor. For example, a first service endpoint 204 may be configured to handle requests originating from user-facing services (e.g., web sites or servers), while a second service endpoint 204 may be configured to handle requests originating from non-user facing devices (e.g., database servers, etc.).

In some instances, service endpoints 204 may be grouped according to a given criteria, such as physical location of the service endpoint 204. For example, a number of service endpoints 204 may be included within a regional service group 202A corresponding to North America. Similarly, regional service group 202B may correspond to Europe, while regional service group 202C may correspond to Asia, and regional service group 202D may correspond to Latin America. Each regional service group 202 may further include additional components, such as a data store 206. Each data store 206 may correspond, for example, to one of the data stores 114 of FIG. 1. For example, the data store 206 within regional service group 202A may include information regarding resources within the given resource space 110 that are associated with North America (e.g., information regarding North American customers of an e-commerce site).

Though one illustrative hierarchy of a resource space is described herein, one skilled in the art will appreciate that resource spaces 110 may be configured to include any combination or configuration of service endpoints 204, each configured to return information regarding resources within the resource space 110. For example, a resource space 110 may omit any one or more of the classifications discussed above (e.g., protocol, region, etc.) Moreover, a resource space 110 may include additional classifications, such as the type of computing device implementing a service endpoint or a required authentication level of requestors (e.g., authenticated and non-authenticated service endpoints). As such, the depicted configuration of a resource space 110 is intended to be illustrative, and not limiting.

In some embodiments, resolution rules for identifying a service endpoint 204 (e.g., as provided by a resource resolution server 102 of FIG. 1) may correspond to, or be based at least in part on, a hierarchical structure or grouping of service endpoints 204. For example, in the illustrative embodiment of FIG. 2, service endpoints 204 are collected into regional service groups 202, which are arranged into service interfaces 112, which are arranged into resource spaces 110. As such, in some embodiments, each of the resource spaces 110, service interfaces 112, regional service groups 202, and service endpoints 204 may provide resolution rules for identifying the next contact within the hierarchical structure. For example, each resource space 110 may provide resolution rules for identifying a service interface 112; each service interface 112 may provide resolution rules for identifying a regional service group 202; and each regional service group 202 may provide resolution rules for identifying a regional service endpoint 204. Accordingly, each level of a hierarchical arrangement of service endpoints 204 may be managed independently, such that the rules for identifying a regional service group 202 may not be required to be known by a resource space 110. Such a structuring of resolution rules may enable a restructuring of hierarchy of service endpoints 204 with minimal changes to resolution rules (e.g., changes may only be required for rules pointing to, or provided by an altered structure).

Further, in some embodiments, multiple resolution rules may be linked without regard to the hierarchical structure of service endpoints 204. For examples, multiple resolution rules may be linked in order to create modularity of the resolution rules, such that any individual set of resolution rules may be modified while only affecting resolution rules that point directly to the modified set of resolution rules. For example, a first set of resolution rules may, based at least in part on an aspect of a resource request, determine that a second set of resolution rules should be retrieved and implemented. Such a second set of resolution rules may, in turn, reference a third set of resolution rules, etc., until a final set of resolution rules identifies an applicable service endpoint 204 for accepting the resource request. As such, resolution rules may be combined to achieve any level of granularity desired.

Figure 3:
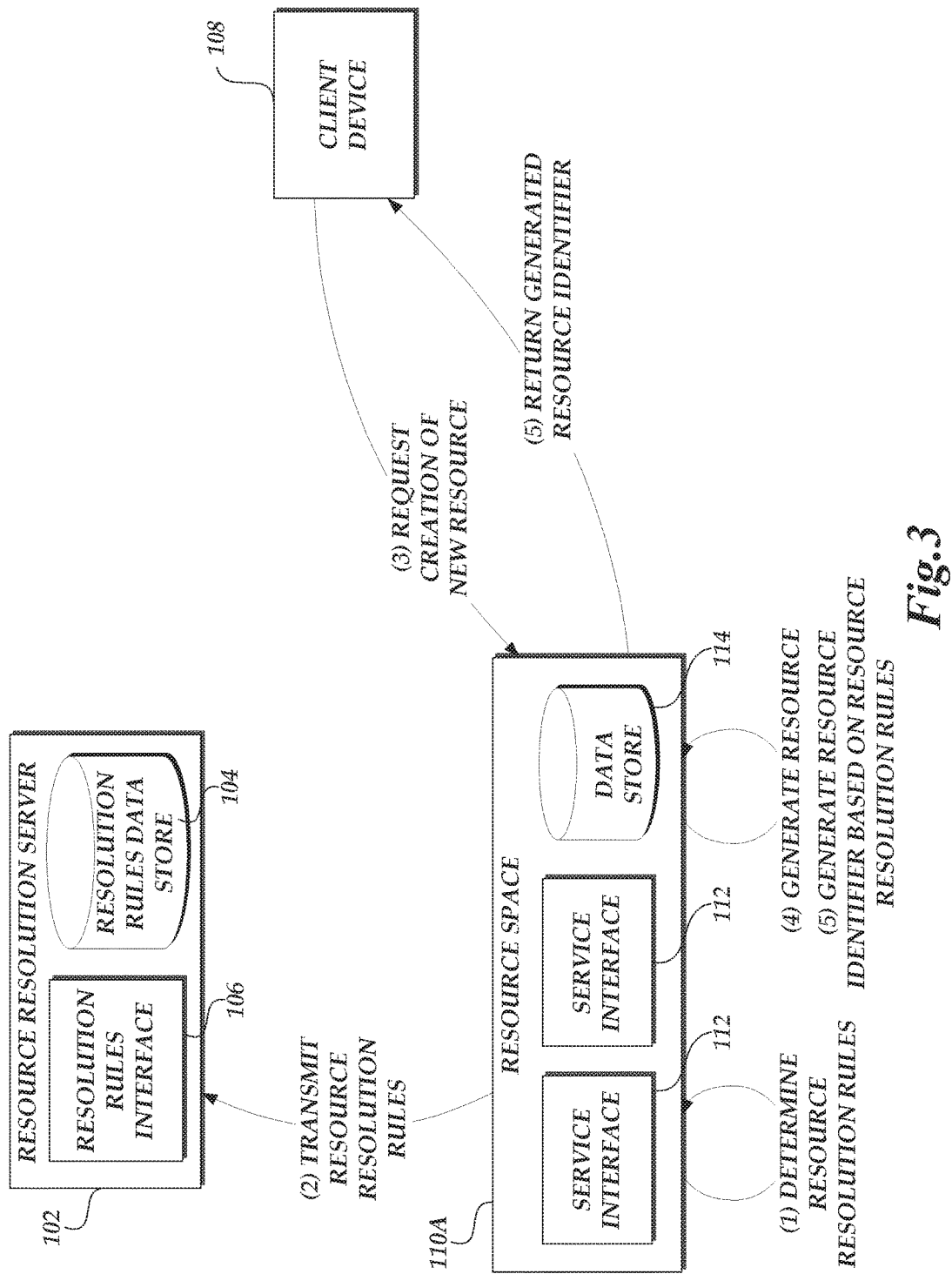
FIG. 3 is a block diagram depicting the transmission of resource resolution rules from a resource space to a resource resolution server of FIG. 1, as well as the creation of a new resource by the resource space.

With reference now to FIG. 3, a block diagram is shown depicting the transmission of resource resolution rules from a resource space, such as a resource space 110A of FIG. 1, as well as creation of a resource conforming to such resource resolution rules. In this regard, a resource space 110A may, at (1), determine a set of resource resolution rules. As described generally above, resource resolution rules may include a set of criteria for determining a resource address based at least in part on a resource identifier. Optionally, resource resolution rules may further include criteria for determining a resource address based on additional information, such as aspects of the request or the requesting device.

Illustratively, a resource identifier may include a number of elements, such as an identifier of the resource space to which the resource belongs and an indication of the identity of the resource itself. For example, a resource generated and stored by the resource space 110A of FIG. 1 may correspond to "RS110A:0001," where the portion prior to the colon ("RS110A") represents the resource space 110A, and the portion after the colon ("0001") represents the specific resource created. In this case, the resource RS110A:0001 may correspond to the first resource created and stored on the resource space 110A.

In some embodiments, a resource identifier may include further information regarding a resource. For example, in some embodiments, a resource identifier may include a hint or other information regarding the nature and location of a resource. Illustratively, as described above with respect to FIG. 2, a resources space 110 (such as resource space 110A) may be subdivided into regional service groups, such as a regional service group 202 of FIG. 2. Accordingly, a hint may be included into a resource identifier to directly identify the regional service group 202 to which a resource belongs. Illustratively, the resource identifier "RS110A:0001" discussed above may be modified to "RS110A:NA:0001," where the newly added section "NA" represents that the resource is assigned to the North American regional service group 202. Still further, in some embodiments, versioning information may be included for a resource identifier, or for one or more portions of an identifier. Illustratively, in continuation of the example discussed above, an identifier may be modified to "RS110A:1.NA:0001," where the newly included "1." represents that the hint "NA" is a version 1 hint. Similarly, versioning information may be included for other aspects of the resource identifier, such as the identifier for the specific resource (e.g., "0001"), the resource space 110A, or the identifier as a whole.

As an example of the potential usefulness of versioning information, consider a hypothetical situation in which additional regional service groups 202 are added and defined by country, rather than continent. As such, a new hint portion of an identifier may be created (e.g., version 2), and may reference a country code, rather than continent code. Illustratively, a new identifier may correspond to "RS110A:2.US:0005." In determining a specific resource address corresponding to the identifier, a client device, such as client device 108 of FIG. 1, may apply specific rules based on versioning information within an identifier. For example, where the portion "1.NA" is included in an identifier, a client device 108 may be configured to locate a resource based on continent. Similarly, where the portion "2.US" is included in an identifier, a client device 108 may be configured to locate a resource based on country.

Though aspects of resource identifiers are discussed above, one skilled in the art will appreciate that additional or alternative resource identification schemes may be used without departing from the present disclosure. For example, portions of identifiers may be separated by any character or symbol (e.g., dashes, dots, hexadecimal codes, specific characters, etc.). Additional information may be included within a resource identifier, such as a preamble indicating its status as an identifier (e.g., "Identifier:RS110A:2.US:0005") . Moreover, information discussed above may be excluded from an identifier, such as "hint" portions, or specific resource spaces to which a resource belongs. In general, one skilled in the art will appreciate that a resource identifier may contain any amount of information sufficient to uniquely identify a resource. Further, a resource identifier may be encoded according to any format capable of representing such information, including text strings, binary data files, classes, structs, etc.

In some embodiments, resource identifiers may be obfuscated or encrypted. For example, any of the illustrative identifiers above may be modified by any known encryption or obfuscation technique, in order to provide added security to a resource resolution system.

Returning to FIG. 3, at (1), the resource space 110A may determine a set of resource resolution rules for resolving a resource address based at least in part on a resource identifier. In some embodiments, resource resolution rules may include filtering criteria for extracting useful information from a resource identifier. For example, using the resource identifier discussed above, "Identifier:RS110A:2.US:0005," resolution rules may first specify that a resource identifier should be checked to verify that the identifier begins with "Identifier," and that otherwise, an error be returned. Further, in some embodiments, where resolution rules are specific to each resource space 110, resolution rules may first specify that a resource identifier should be checked to verify that the identifier includes a reference to the correct resource space 110A (e.g., identifier begins includes "RS110A"). Resolution rules may specify that, if the above rules are satisfied, a hint should be extracted from the identifier. In the present example, that hint may correspond to "2.US." The version number of the hint, as well as information regarding the hint, may be used to identify an applicable sub-rule. For example, an identifier including a hint version 1 (e.g., beginning with "1.") may be referred to different sub-rules than an identifier including a hint version 2 (e.g., beginning with "2."). A sub-rule directed towards a specific hint version may further redirect a resource resolution request to additional sub-rules. For example, a first sub-rule may specify that, for identifiers including a hint version 2, the two letters following the hint version should be extracted and used to identify a next sub-rule. Illustratively, an identifier including "2.US" may be redirected to a rule specifically for United States based resources. Similarly, an identifier including "2.EU" may be redirected to a rule specifically for European based resources. As will be appreciated by one skilled in the art, any number of sub-rules could be defined and linked to an initial set of resolution rules, such that each intermediate sub-rule directs a request to a next rule, until a final address is resolved. In other embodiments, the entirety of resolution rules may be contained within one resolution rule set.

As discussed above, in some embodiments, rules may be based on information included within a client request, such as the identity of the client, or the protocol by which a resource request should be transmitted. For example, a client may specify that a protocol of SOAP/SMTP is preferred. As such, an initial set of resolution rules (or sub-rules thereof) may direct a request to rules for a given service interface 112. Further, a client may specify that they are requesting a resource for a user-facing process. As such, an initial set of resolution rules (or sub-rules thereof) may direct a client device 108 to request rules for a given service endpoint, such as a service endpoint 204 provisioned for user-facing services.

In some embodiments, rules may utilize filtering or sorting techniques to determine one or more aspects of a resource request received from a client, or a resource identifier within the request. For example, where a client resource request includes text fields of given names, resolution rules may use regular expressions to determine the value of each field. Further, regular expressions or similar filtering techniques could be used to extract information contained within portions of a resource identifier (e.g., based on a known format of resource identifier).

Returning now to FIG. 3, after a resource space 110A has determined a set of resource resolution rules, it may, at (2), transmit the determined resource resolution rules to a resource resolution server 102. The resource resolution server 102 may thereafter make available the resource resolution rules to client devices 108. For example, the resource resolution server 102 may store the transmitted resolution rules within the resolution rules data store 104. As will be described in more detail below with respect to FIG. 3, the resolution rules may be made available to requesting client devices 108 in order to resolve resource addresses.

Thereafter, at (3), the resource space 110A may receive a request for creation of a new resource. Illustratively, creation of a new resource may correspond to any creation of information or addressable object on a resource space 110 (such as resource space 110A). For example, where a resource space 110 corresponds to a portion of a collaborative website, a new resource may correspond to a new article or page created on the object. As a further example, where a resource space 110 corresponds to an e-commerce site, a new resource may correspond to a new order created by a customer of the site. At (4), the new resource item may be created, stored, or otherwise maintained on the resource space 110A (e.g., in a database). Thereafter, at (5), the resource space 110A may assign a unique resource identifier to the resource. For example, in the examples given above, a resource identifier may follow the form "Identifier:[Resource_Space]:[Hint]:[Unique_Number_String]," where "[Resource_Space]" corresponds to an identifier of a resource space, "[Hint]" corresponds to information regarding lookup of the resource identifier, and "[Unique_Number_String]" corresponds to a unique number assigned to the resource. Illustratively, if a newly created resource is the eight hundredth resource on the resource space 110A, a generated resource identifier may correspond to "Identifier: RS100A:2.US:0800." At (6), this generated resource identifier may be returned to the requesting client device 108. As will be described in more detail below, the client device 108 (or other client devices 108) may utilize the returned resource identifier, in conjunction with resource resolution rules, to retrieve information regarding the resource corresponding to the resource identifier (e.g., the web page, the order, etc.).

Figure 4:
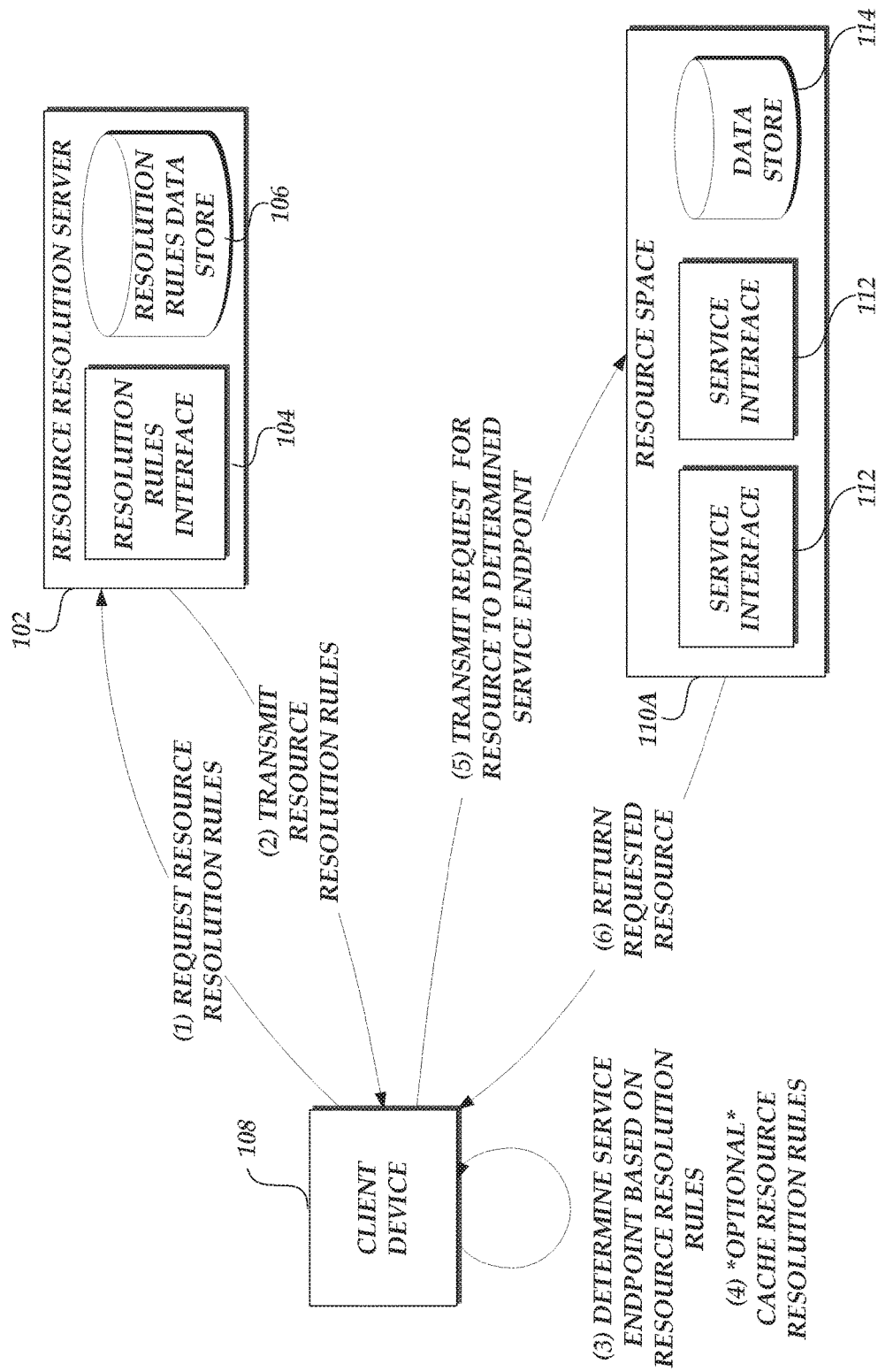
FIG. 4 is a block diagram depicting the resolution of a resource address for a resource based on resource resolution rules, as well as interaction with the resource address by a client device of FIG. 1.

With reference now to FIG. 4, a block diagram is shown depicting the resolution of a resource address based on resource resolution rules as well as on a resource identifier. In this regard, a client device, such as client device 108 of FIG. 1, may, at (1), request resource resolution rules from a resource resolution server, such as resource resolution server 102 of FIG. 1. In some embodiments, a client device 108 may request global resource resolution rules (e.g., rules applicable to all resource spaces). Thereafter, a client device 108 may utilize such global resolution rules in order to determine a resource space 110 associated with a requested resource. In other embodiments, a client device 108 may be configured to determine a resource space 110 from which a resource is requested. In some embodiments, identifiers may include a direct reference to the resource space 110 in which the identified resource is located. As such, in these embodiments, a client device 108 may request rules directed to a specific resource space 110. Thereafter, the resource resolution server 102 may transmit the requested resource resolution rules to the client device 108.

At (3), the client device 108 may utilize the resolution rules to determine a resource address at which to request the required resource. For example, in some embodiments, resource rules may directly link a resource identifier to a resource address. Illustratively, resource rules may specify that resource identifier "1" is located at "http://myfirstresource.TLD," resource identifier "2" is located at "http:// mysecondresource.TLD," etc. In other embodiments, resource rules may parse, filter, or sort information regarding a client device or resource identifier in order to resolve a resource address. Illustratively, as described above, a first set of resource resolution rules may lead to a number of sub-sets of resolution rules based on, for example, an aspect of the client device 108 (e.g., user-facing or non-user facing, production or non-production, geographic location, etc.) or a portion of resource identifier (e.g., an included hint, a format, etc.). As a further example, a first rule set may specify individual sub-rule sets based on a requested protocol of interaction with a service endpoint (e.g., service endpoints 204 of FIG. 2). Each protocol-based sub-rule set may specify further sub-rule sets based on, e.g., a geographic location associated with the requested resource (e.g., North American resource, European resource, etc.). As will be appreciated by one skilled in the art, any number of sub-rule sets may be provided to arrange resource identifiers according to any hierarchy. In such a hierarchy, a final rule set may be provided which directs a requesting client device 108 to an address at which to locate a resource. For example, a resource identifier of "Identifier:RS100A:2.US:0800" (corresponding to the format "Identifier:[Resource_Space]:[Hint]:[Unique_Number_String]" described in more detail above) and requested via the REST/HTTP protocol may resolve to a resource address of "http://RS100A.US.myDomain.TLD/getResource?resourceID=0800," at which the client device 108 may interact with the desired resource, as will be described below.

In some embodiments, client devices 108 may be configured to cache received resolution rules, such that future resource resolution may occur without requiring interaction with the resource resolution server 102. Illustratively, such caching may include storing resource resolution rules on the client device 108 for further use. In some such embodiments, techniques may be employed to verify the authority of such cached resolution rules. For example, a client device 108 may compare a hash value of the cached resolution rules to a hash value provided by the resource resolution server, thereby ensuring that the cached rules match those available from the resource resolution server 102. In other embodiments, cached resolution rules may be refreshed only if a resource address fails to return and expected resource.

After resolving a resource address for a given resource identifier, the client device 108 may transmit at (5) a request for the identified resource to the determined resource address, which may correspond to a service endpoint (such as service endpoint 204 of FIG. 2) within a resource space 110A. Thereafter, the resource space 110A may return the requested resource to the client device 108 for use. Though generally described in terms of a requested and a returned resource, the present disclosure is not limited to information resources that may be returned to client devices 108, but may include any resource addressable within a resource space. For example, resources may include locations of services, APIs, etc., that may be accessed by a client device 108 via a resource address.

Figure 5:
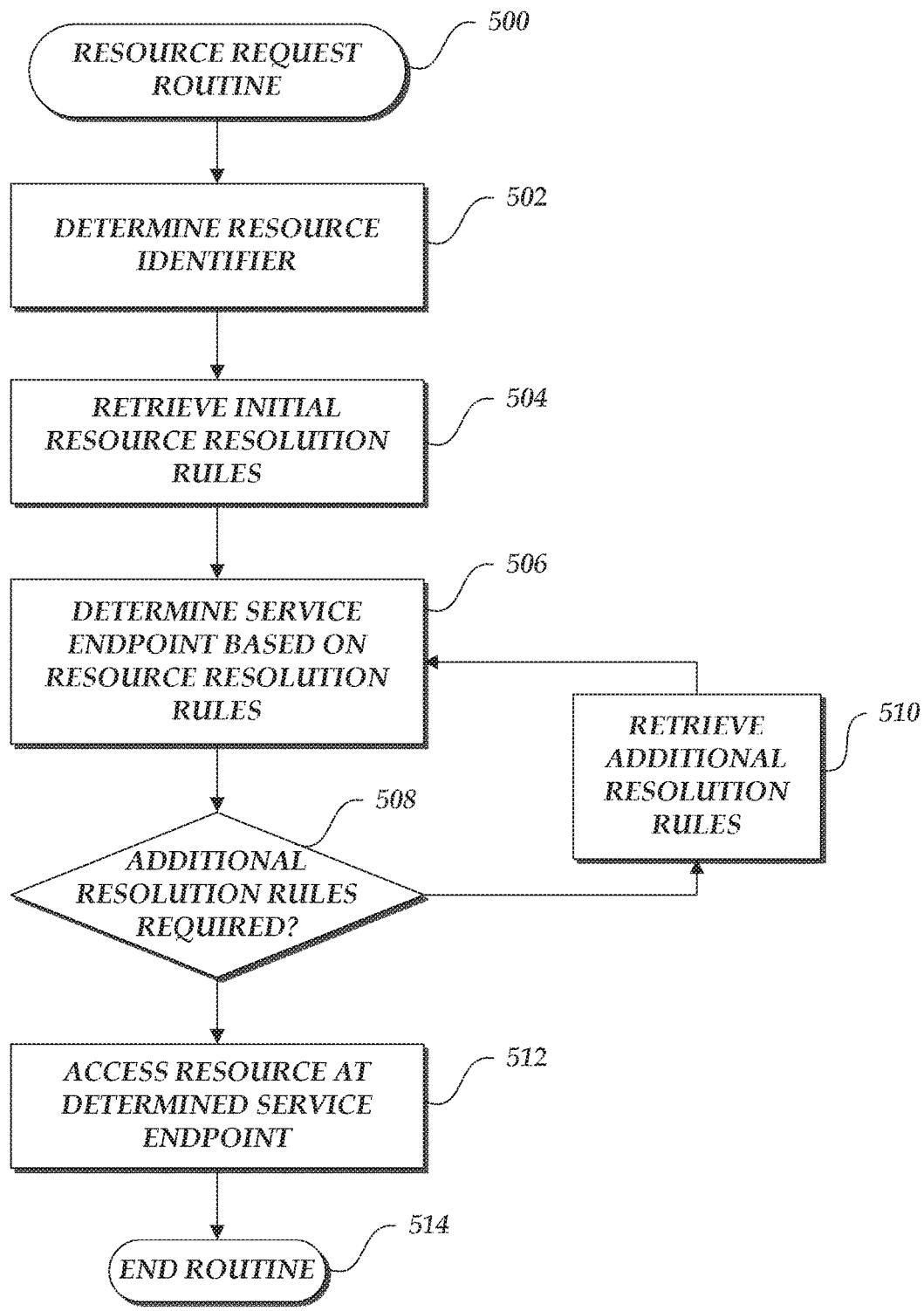
FIG. 5 is a flow diagram depicting an illustrative routine for interacting with a resource, including resolving a resource address based on resource resolution rules.

With reference to FIG. 5, a flow diagram is shown depicting an illustrative routine 500 for processing a resource request based on a resource identifier, including resolving a resource address based on a set of resource resolution rules. For example, the routine 500 may be carried out by a client device 108 in order to access a required resource. Specifically, at block 502, a resource identifier may be determined that corresponds to a desired resource. In some embodiments, this resource identifier may have been returned from a resource space (e.g., resource space 110A of FIG. 1) at the time of creation of a resource. In other embodiments, a resource identifier may have been received by indirect channels. For example, a client device 108 may have received the resource identifier from a database or other data store which, in turn, originally received the resource identifier from the resource space 110A at the time of creation of a resource. Illustratively, a user may have, at some point in the past, created an order for an item from an e-commerce site. Thereafter, a resource identifier corresponding to the order may have been generated and stored in a database of the user's order history. At a later point in time, the user may request information regarding the order. As such, a client device 108 (e.g., a web site serving the user, or the user's device) may retrieve the resource identifier corresponding to the order and attempt to gather information regarding the order.

Accordingly, at block 504, the client device 108 may retrieve an initial set of resource resolution rules. As described above with respect to FIG. 4, such retrieval may include requesting resource resolution rules from a resource resolution server (e.g., resource resolution server 102 of FIG. 1). In some embodiments, an initial set of resource resolution rules may be a set of global rules used for identifying all resource addresses. In other embodiments, an initial set of resource rules may be a set of rules specific to a resource space 110 (e.g., determined based on a resource identifier). At 506, the client device 108 may utilize the retrieved resource rules to determine a service endpoint. As described above, such a determination may include comparing a desired resource identifier and/or aspects of the client request to the retrieved resource rules in order to determine either (1) additional rules that are required to resolve a request, (2) a resolved resource address, or (3) an error condition. For example, resource rules may state that for a given identifier, all requests should be addressed to a given, default resource address. Moreover, resource rules may state that for certain specific identifiers, further rules are required to resolve a resource address. Still further, resource rules may state that for other identifiers (e.g., malformed identifiers) an error should be returned to the client device 108.

At block 508, the client device 108 may make a determination of whether additional rules are required to resolve a resource address. For example, as described above with respect to FIG. 3, each level of a hierarchy of resources may specify rules for resolving resources managed by that hierarchy component. As such, an initial set of rules may correspond to a first level of hierarchy, and may direct the client device 108 for to specific rules for one or more components of a second level of the hierarchy component, etc., until a final resource address is specified. Accordingly, if additional rules are required in order to resolve a resource address, the routine 500 may continue at block 510 where additional resource rules may be retrieved (e.g., from the resource resolution server 102). The routine 500 may then return to blocks 506 and 508 as discussed above.

Subsequent to determining a resource address for a given resource identifier, the routine 500 may then continue at block 512, where the client device 108 may access the required resource (e.g., by use of a service endpoint 204 of FIG. 2). Illustratively, access to a required resource may include requesting information regarding the resource, implementing the resource, or otherwise interacting with a resource. Subsequent to such access, the routine 500 may terminate at block 514.

Though the routine 500 is generally described above with reference to a client device 108, in some embodiments, one or more aspects of the routine 500 may be carried out by additional or alternative computing devices, such as a resource resolution server 102. For example, in some embodiments, a resource resolution server 102 may be configured to receive a resource identifier from a client device 108, to resolve the resource address utilizing a set of resolution rules, and to return the address to the client device 108.

In addition, though a single resource resolution server 102 is generally described herein, in some embodiments, multiple resource resolution servers 102 may be implemented. In some embodiments, each of a number of resource resolution services may contain a portion of all resolution rules. Such portions of resolution rules may be divided accordingly to any grouping, and may include overlapping or duplicative storage of resolution rules. For example, each resource space 110 may be associated with one of a number of resource resolution server 102, such that client requests initially are directed to a global resource resolution server 102, and then redirected to a resource space 110 specific resource resolution server 102. Additional resource resolution servers 102 may be provided within each resource space (e.g., corresponding to each service interface 112, each service endpoint 204, etc.).

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing computing resources, the method comprising:
    under control of one or more computing devices configured with specific computer-executable instructions,
        receiving a resource identifier corresponding to a resource, wherein the resource is associated with at least one service endpoint configured to provide access to the resource, wherein the resource identifier corresponds to at least one of a non-deprecated resource identifier format or a deprecated resource identifier format, and wherein the deprecated resource identifier format corresponds to a non-current format;
        determining a set of resolution rules for identifying the at least one service endpoint associated with the resource identifier, wherein the set of resolution rules is defined at least in part by an entity associated with the resource space, and wherein the set of resolution rules includes a first resolution rule enabling identification of a first service endpoint associated with identifiers of the non-deprecated resource identifier format and a second resolution rule enabling identification of a second service endpoint associated with identifiers of the deprecated resource identifier format;
        identifying at least one of the first service endpoint or the second service endpoint as the at least one service endpoint based at least in part on the set of resolution rules and the resource identifier; and
        transmitting at least one of (i) a request to the at least one service endpoint to access the resource or (ii) an address corresponding to the at least one service endpoint to a requesting computing device.

2. The computer-implemented method of claim 1, wherein the resource comprises at least one of an information object, a network service, or an application programming interface.

3. The computer-implemented method of claim 1, wherein the at least one service endpoint is associated with a resource space, and wherein the resource space includes a plurality of service endpoints, each of the plurality of service endpoints configured to receive resource requests according to a different request protocol.

4. The computer-implemented method of claim 1, wherein the set of resolution rules including at least an initial set of rules, a first subset of rules, and a second subset of rules, and wherein identifying at least one of the first service endpoint or the second service endpoint as the at least one service endpoint based at least in part on the set of resolution rules and the resource identifier comprises:
    determining at least one rule of the first subset of rules applicable to the resource identifier based at least in part on the initial set of rules; and
    determining at least one rule of the second subset of rules applicable to the resource identifier based at least in part on the first subset of rules.

5. The computer-implemented method of claim 1 further comprising determining a second set of resolution rules for identifying the at least one service endpoint associated with the resource identifier, and wherein identifying at least one of the first service endpoint or the second service endpoint as the at least one service endpoint is further based at least in part on the second set of resolution rules.

6. The computer-implemented method of claim 1, wherein identifying at least one of the first service endpoint or the second service endpoint as the at least one service endpoint is further based at least in part on a desired protocol for interaction with the at least one service endpoint.

7. The computer-implemented method of claim 1, wherein identifying at least one of the first service endpoint or the second service endpoint as the at least one service endpoint is further based at least in part on an identity of a device requesting access to the resource.

8. A system comprising:
a memory that stored specific computer-executable instructions; and
a processor in communication with the memory, the processor configured to execute the computer-executable instructions to at least:
receive a resource identifier corresponding to a resource, wherein the resource is associated with at least one service endpoint configured to provide access to the resource, wherein the resource identifier corresponds to at least one of a non-deprecated resource identifier format or a deprecated resource identifier format, and wherein the deprecated resource identifier format corresponds to a non-current format;
determine a set of resolution rules for identifying the at least one service endpoint associated with the resource identifier, wherein the set of resolution rules is defined at least in part by an entity associated with the at least one service endpoint, and wherein the set of resolution rules includes a first rule enabling identification of a first service endpoint associated with identifiers of the non-deprecated resource identifier format and a second rule enabling identification of a second service endpoint associated with identifiers of the deprecated resource identifier format;
identify at least one of the first service endpoint or the second service endpoint as the at least one service endpoint based at least in part on set of resolution rules and at least in part on the resource identifier; and
transmit at least one of (i) a request to the at least one service endpoint to access the resource or (ii) an address corresponding to the at least one service endpoint to a requesting computing device.

9. The system of claim 8, wherein the address corresponding to the at least one service endpoint is included within a notification to the requesting computing device.

10. The system of claim 8, wherein the set of resolution rules corresponds to at least an initial set of rules, a first subset of rules, and a second subset of rules, and wherein the one or more computing devices are configured to identify at least one of the first service endpoint or the second service endpoint as the at least one service endpoint at least partly by:
determining at least one rule of the first subset of rules applicable to the resource identifier based at least in part on the initial set of rules; and
determining at least one rule of the second subset of rules applicable to the resource identifier based at least in part on the first subset of rules.

11. The system of claim 8, wherein the at least one service endpoint is associated with a resource space, and wherein the resource space includes a plurality of service endpoints, each of the plurality of service endpoints configured to receive resource requests according to a different request protocol.

12. The system of claim 8, wherein the processor is further configured to execute the specific computer-executable instructions to at least determine a second set of resolution rules for identifying the at least one service endpoint associated with the resource identifier, and wherein identification of at least one of the first service endpoint or the second service endpoint as the at least one service endpoint is further based at least in part on the second set of resolution rules.

13. The system of claim 8, wherein identification of at least one of the first service endpoint or the second service endpoint as the at least one service endpoint is further based at least in part on a desired protocol for interaction with the at least one service endpoint.

14. The system of claim 8, wherein identification of at least one of the first service endpoint or the second service endpoint as the at least one service endpoint is further based at least in part on an identity of the requesting device.

15. A computer-readable, non-transitory storage medium having computer-executable instructions for managing computing resources, wherein the computer-executable instructions that, when executed by a computing system, perform operations comprising:
receiving a resource identifier corresponding to a resource, wherein the resource is associated with at least one service endpoint configured to provide access to the resource, wherein the resource identifier corresponds to at least one of a non-deprecated resource identifier format or a deprecated resource identifier format, and wherein the deprecated resource identifier format corresponds to a non-current format;
determining a set of resolution rules for identifying the at least one service endpoint associated with the resource identifier, wherein the set of resolution rules is defined at least in part by an entity associated with the at least one service endpoint, and wherein the set of resolution rules includes a first rule enabling identification of a first service endpoint associated with identifiers of the non-deprecated resource identifier format and a second rule enabling identification of a second service endpoint associated with identifiers of the deprecated resource identifier format;
identifying at least one of the first service endpoint or the second service endpoint as the at least one service endpoint based at least in part on the set of resolution rules and at least in part on the resource identifier; and
transmit at least one of (i) a request to the at least one service endpoint to access the resource or (ii) an address corresponding to the at least one service endpoint to a requesting computing device.

16. The computer-readable, non-transitory storage medium of claim 15, wherein the set of resolution rules corresponds to at least an initial set of rules, a first subset of rules, and a second subset of rules, and wherein the computer-executable instructions further cause the computing system to identify the at least one service endpoint at least partly by:
determining at least one rule of the first subset of rules applicable to the resource identifier based at least in part on the initial set of rules; and
determining at least one rule of the second subset of rules applicable to the resource identifier based at least in part on the first subset of rules.

17. The computer-readable, non-transitory storage medium of claim 15, wherein the at least one service endpoint is associated with a resource space, and wherein the resource space includes a plurality of service endpoints, each of the plurality of service endpoints configured to receive resource requests according to a different request protocol.

18. The computer-readable, non-transitory storage medium of claim 15, wherein the computer-executable instructions that, when executed by the computing system, further perform operations comprising:

determining a second set of resolution rules for identifying the at least one service endpoint associated with the resource identifier, and wherein identification of at least one of the first service endpoint or the second service endpoint as the at least one service endpoint is further based at least in part on the second set of resolution rules.

19. The computer-readable, non-transitory storage medium of claim 15, wherein identification of at least one of the first service endpoint or the second service endpoint as the at least one service endpoint is further based at least in part on a desired protocol for interaction with the at least one service endpoint.

20. The computer-readable, non-transitory storage medium of claim 15, wherein identification of at least one of the first service endpoint or the second service endpoint as the at least one service endpoint is further based at least in part on an identity of the requesting device.

* * * * *